(12) United States Patent
Ma

(10) Patent No.: US 9,977,284 B2
(45) Date of Patent: May 22, 2018

(54) DISPLAY PANEL AND MANUFACTURING THEREOF

(71) Applicant: Shenzhen China Star Optoelectronics Technology Co., Ltd., Shenzhen City (CN)

(72) Inventor: Chao Ma, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 322 days.

(21) Appl. No.: 14/781,587

(22) PCT Filed: Aug. 24, 2015

(86) PCT No.: PCT/CN2015/087906
§ 371 (c)(1),
(2) Date: Oct. 1, 2015

(87) PCT Pub. No.: WO2017/024613
PCT Pub. Date: Feb. 16, 2017

(65) Prior Publication Data
US 2017/0146860 A1    May 25, 2017

(30) Foreign Application Priority Data
Aug. 11, 2015  (CN) .......................... 2015 1 0489939

(51) Int. Cl.
*G02F 1/1335*  (2006.01)
*G02F 1/1343*  (2006.01)
(Continued)

(52) U.S. Cl.
CPC ...... *G02F 1/133621* (2013.01); *G02F 1/1334* (2013.01); *G02F 1/1368* (2013.01);
(Continued)

(58) Field of Classification Search
CPC ......... G02F 1/1334; G02F 2001/01791; G02F 2001/01783
See application file for complete search history.

(56) References Cited

U.S. PATENT DOCUMENTS

| | | | |
|---|---|---|---|
| 5,942,154 A * | 8/1999 | Kim ..................... | C09K 19/544 252/299.01 |
| 2005/0099575 A1 * | 5/2005 | Liang .................. | C09K 19/544 349/153 |

(Continued)

Primary Examiner — Dennis Y Kim
(74) Attorney, Agent, or Firm — Leong C. Lei

(57) ABSTRACT

The present invention provides a display panel and a manufacture method thereof, of which the structure of the display panel is simple, and the manufacture cost is low, and meanwhile, the great display quality is possessed. The manufacture method of the display panel according to the present invention combines the polymer dispersed liquid crystal and the quantum dots, and modifies the structure of traditional upper, lower substrates to acquire a new type display panel. In comparison with the manufacture process of the traditional display panel, the manufacture or addition of the color filter, the alignment films and polarizers are eliminated, and the manufacture process is simple, and the manufacture cost is low, and meanwhile, the display result of the manufactured display panel is new and special, and five display effects of red, green, blue, white, and blur-opaque are provided and the great display quality is possessed.

4 Claims, 5 Drawing Sheets

(51) Int. Cl.
*G02F 1/1334* (2006.01)
*G02F 1/1368* (2006.01)
*G02F 1/1339* (2006.01)

(52) U.S. Cl.
CPC ...... *G02F 1/13394* (2013.01); *G02F 1/13439* (2013.01); *G02F 1/134336* (2013.01); *G02F 2001/133614* (2013.01); *G02F 2001/134345* (2013.01); *G02F 2202/28* (2013.01); *G02F 2202/36* (2013.01)

(56) References Cited

U.S. PATENT DOCUMENTS

| | | | | |
|---|---|---|---|---|
| 2009/0244442 | A1* | 10/2009 | Lee | G02F 1/13718 349/86 |
| 2010/0208172 | A1* | 8/2010 | Jang | B82Y 20/00 349/71 |
| 2010/0302497 | A1* | 12/2010 | Chang | G02F 1/13394 349/156 |
| 2010/0326592 | A1* | 12/2010 | Ishitani | G02F 1/1341 156/250 |
| 2011/0096009 | A1* | 4/2011 | Kurokawa | G06F 3/0412 345/173 |
| 2015/0286103 | A1* | 10/2015 | Sato | G02F 1/1334 349/86 |

\* cited by examiner

DISPLAY PANEL AND MANUFACTURING THEREOF

FIELD OF THE INVENTION

The present invention relates to a display technology field, and more particularly to a display panel and a manufacture thereof.

BACKGROUND OF THE INVENTION

The LCD (Liquid Crystal Display) possesses advantages of thin body, power saving and no radiation to be widely used in many application scope. Most of the liquid crystal displays on the present market are back light type liquid crystal display devices, which comprise a liquid crystal display panel and a back light module. Generally, the liquid crystal display panel comprises a CF (Color Filter) substrate, a TFT (Thin Film Transistor) substrate, LC (Liquid Crystal) sandwiched between the CF substrate and TFT substrate and sealant. The working principle of the liquid crystal display panel is to locate liquid crystal molecules between two parallel glass substrates. By applying driving voltages to control whether the liquid crystal molecules to be changed directions, and changing the polarization of the light of the backlight module, and achieving the penetration or stop of the light path with polarizer, the objective of display can be realized.

The polymer dispersed liquid crystal (PDLC) as being liquid crystal light valve, has been widely concerned and used in the recent years. It is to mix the low-molecular liquid crystal and the prepolymer, in certain condition with polymerization, to form micron liquid micro drops to be evenly distributed in the high polymer network. Then, the dielectric anisotropy of the liquid crystal molecules are utilized to obtain the material with electro-optical property, which mainly works between the scatter state and the vitreous state and possesses a certain gray scale. The working principle is: in condition without applied voltage, a regular electrical field cannot formed between the PDLC thin films, and the light axis of the liquid crystal micro particle is orientated randomly and shows the disordered state. The refractivity and the refractivity of the polymer do not match, and the incident light is intensely scattered, and the PDLC thin film appears to be opaque or semitransparent; after the external voltage is applied, the light axis of liquid crystal micro particle is aligned to be perpendicular with the thin film surface, i.e. consistent with the electrical field direction. The refractivity of the liquid crystal micro particle and the refractivity of the polymer basically match. No obvious interfaces exist in the film to construct a substance which basically is uniform. Therefore, the incident light will not be scattered, and the PDLC thin film appears to be transparent. Besides, under the driving of the applied electrical field, the PDLC film possesses light switch property, and the transparency is raised along a certain curve with the increase of the applied voltage.

Besides, quantum dot (QD) as being a new raising display material has already been widely approved and concerned. The quantum dot is quasi-zero-dimensional nano material, which is constructed with a small amount of atoms. Roughly speaking, the sizes of the three dimensions of the quantum dot are all below 100 nanometer (nm), and the appearance is like an extremely tiny spot substance. The movements of the inner electron in respective directions are all restricted. The quantum confinement effect is particularly obvious. It possesses excellent properties that the excitation spectrum is wide and the distribution is continuous but the emission spectrum is narrow and symmetrical, and the color is adjustable, and the color chemical stability is high, and the fluorescence lifetime is long, and it is an ideal light emitting material. There are two different major types in the present quantum dots according to the acquirement of the energy. One is photoluminescence, and the other is electroluminescence. The light color of the quantum dot meets the size effect of the quantum dot, i.e. by controlling the shape, structure and size of the quantum dot, the electron statuses, such as the energy gap, exciton binding energy, exciton energy blue shift can be adjusted. With the gradual size decrease of the quantum dot, the light of the quantum dot is absorbed, and the spectrum blue shift phenomenon appears. As the size gets smaller, the spectrum blue shift phenomenon becomes more obvious.

SUMMARY OF THE INVENTION

An objective of the present invention is to provide a display panel, of which the structure is simple, and the manufacture cost is low, and meanwhile, the great display quality is possessed in comparison with the display panel of prior art.

Another objective of the present invention is to provide a manufacture method of a display panel, which combines the polymer dispersed liquid crystal and the quantum dots, and modifies the structure of traditional upper, lower substrates to acquire a new type display panel. In comparison with the manufacture process of the traditional display panel, the manufacture or addition of the color filter, the alignment films and polarizers are eliminated, and the manufacture process is simple, and the manufacture cost is low, and meanwhile, the display result of the manufactured display panel is new and special, and five display effects of red, green, blue, white, and blur-opaque are provided and the great display quality is possessed.

For realizing the aforesaid objective, the present invention first provides a display panel, comprising an upper substrate, a lower substrate and a border adhesive at a border position between the upper substrate and the lower substrate;

the upper substrate comprises a first transparent substrate and a transparent organic material layer located on the first transparent substrate, and in the transparent organic material layer, a plurality of rectangular via holes aligned in array, and the plurality of rectangular via holes and the first transparent substrate surround to form a plurality of sub pixel recesses, and the plurality of sub pixel recesses comprises a red sub pixel recess, a green sub pixel recess, a blue sub pixel recess and a white sub pixel recess; a mixture of red quantum dots and PDLC is provided in the red sub pixel recess, and a mixture of green quantum dots and PDLC is provided in the green sub pixel recess, and a mixture of blue quantum dots and PDLC is provided in the blue sub pixel recess, and only PDLC is provided in the white sub pixel recess;

the lower substrate comprises a second transparent substrate, a TFT layer located on the second transparent substrate and a pixel electrode layer located on the TFT layer; the pixel electrode layer comprises a plurality of pixel electrodes aligned in array, and the plurality of pixel electrodes are respectively located corresponding to the plurality of sub pixel recesses on the upper substrate.

In the plurality of sub pixel recesses, a plurality of pixel units are constituted with every four sub pixel recesses are a group, and each pixel unit comprises one red sub pixel recess, one green sub pixel recess, one blue sub pixel recess and one white sub pixel recess.

In the pixel unit, the red sub pixel recess, the green sub pixel recess, the blue sub pixel recess and the white sub pixel recess are aligned in arbitrary orders.

All the red quantum dots, the green quantum dots, the blue quantum dots are electroluminescent quantum dots.

In condition that a bias light is white light and voltages are applied, the red sub pixel recess, the green sub pixel recess, the blue sub pixel recess and the white sub pixel recess respectively emit red light, green light, blue light and white light, and intensities of the red light, the green light, the blue light and the white light emitted from the red sub pixel recess, the green sub pixel recess, the blue sub pixel recess and the white sub pixel recess increase along with increase of driving voltages; in condition that no applied voltages exist, all the red sub pixel recess, the green sub pixel recess, the blue sub pixel recess and the white sub pixel recess appear to be blur and opaque.

The present invention further provides a manufacture method of a display panel, comprising steps of:

step 1, providing a first transparent substrate, and coating a layer of transparent organic material on the first transparent substrate to form a transparent organic material layer;

step 2, implementing pattern process to the transparent organic material layer to form a plurality of rectangular via holes aligned in array in the transparent organic material layer, and the plurality of rectangular via holes and the first transparent substrate surround to form a plurality of sub pixel recesses;

step 3, dividing the plurality of sub pixel recesses into a plurality of pixel units with every four sub pixel recesses as a group, and each pixel unit comprises one red sub pixel recess, one green sub pixel recess, one blue sub pixel recess and one white sub pixel recess; spot spray printing a mixture of red quantum dots and PDLC in the red sub pixel recess, and spot spray printing a mixture of green quantum dots and PDLC in the green sub pixel recess, and spot spray printing a mixture of blue quantum dots and PDLC in the blue sub pixel recess, and spot spray printing PDLC in the white sub pixel recess, and curing to acquire an upper substrate;

step 4, providing a lower substrate, and the lower substrate comprises a second transparent substrate, a TFT layer located on the second transparent substrate and a pixel electrode layer located on the TFT layer; the pixel electrode layer comprises a plurality of pixel electrodes aligned in array, and the plurality of pixel electrodes are respectively located corresponding to the plurality of sub pixel recesses on the upper substrate;

step 5, coating a border adhesive at a border of the lower substrate, and implementing vacuum lamination to the lower substrate and the upper substrate to acquire the display panel.

The step 2 specifically is: coating a photoresist layer on the transparent organic material layer, and implementing exposure, development to the photoresist layer with a mask, and etching the transparent organic material layer with the photoresist layer as being a mask layer to acquire the plurality of rectangular via holes aligned in array, and the plurality of rectangular via holes and the first transparent substrate surround to form a plurality of sub pixel recesses, and removing the photoresist layer.

In the pixel unit, the red sub pixel recess, the green sub pixel recess, the blue sub pixel recess and the white sub pixel recess are aligned in arbitrary orders.

All the red quantum dots, the green quantum dots, the blue quantum dots are electroluminescent quantum dots.

Spacers are provided in the border adhesive coated in the step 5.

The present invention further provides a display panel, comprising an upper substrate, a lower substrate and a border adhesive at a border position between the upper substrate and the lower substrate;

the upper substrate comprises a first transparent substrate and a transparent organic material layer located on the first transparent substrate, and in the transparent organic material layer, a plurality of rectangular via holes aligned in array, and the plurality of rectangular via holes and the first transparent substrate surround to form a plurality of sub pixel recesses, and the plurality of sub pixel recesses comprises a red sub pixel recess, a green sub pixel recess, a blue sub pixel recess and a white sub pixel recess; a mixture of red quantum dots and PDLC is provided in the red sub pixel recess, and a mixture of green quantum dots and PDLC is provided in the green sub pixel recess, and a mixture of blue quantum dots and PDLC is provided in the blue sub pixel recess, and only PDLC is provided in the white sub pixel recess;

the lower substrate comprises a second transparent substrate, a TFT layer located on the second transparent substrate and a pixel electrode layer located on the TFT layer; the pixel electrode layer comprises a plurality of pixel electrodes aligned in array, and the plurality of pixel electrodes are respectively located corresponding to the plurality of sub pixel recesses on the upper substrate;

wherein in the plurality of sub pixel recesses, a plurality of pixel units are constituted with every four sub pixel recesses are a group, and each pixel unit comprises one red sub pixel recess, one green sub pixel recess, one blue sub pixel recess and one white sub pixel recess;

wherein all the red quantum dots, the green quantum dots, the blue quantum dots are electroluminescent quantum dots;

wherein in condition that a bias light is white light and voltages are applied, the red sub pixel recess, the green sub pixel recess, the blue sub pixel recess and the white sub pixel recess respectively emit red light, green light, blue light and white light, and intensities of the red light, the green light, the blue light and the white light emitted from the red sub pixel recess, the green sub pixel recess, the blue sub pixel recess and the white sub pixel recess increase along with increase of driving voltages; in condition that no applied voltages exist, all the red sub pixel recess, the green sub pixel recess, the blue sub pixel recess and the white sub pixel recess appear to be blur and opaque.

The benefits of the present invention are: the present invention provides a display panel and a manufacture method thereof. The structure of the display panel is simple, and in comparison with the display panel of prior art, the components, the color filter, the alignment films and polarizers are eliminated, and the manufacture cost is low, and meanwhile, the display result is new and special, and five display effects of red, green, blue, white, and blur-opaque are provided and the great display quality is possessed. The manufacture method of the display panel according to the present invention combines the polymer dispersed liquid crystal and the quantum dots, and modifies the structure of traditional upper, lower substrates to acquire a new type display panel. In comparison with the manufacture process of the traditional display panel, the manufacture or addition of the color filter, the alignment films and polarizers are eliminated, and the manufacture process is simple, and the manufacture cost is low, and meanwhile, the display result of the manufactured display panel is new and special, and five display effects of red, green, blue, white, and blur-opaque are provided and the great display quality is possessed.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
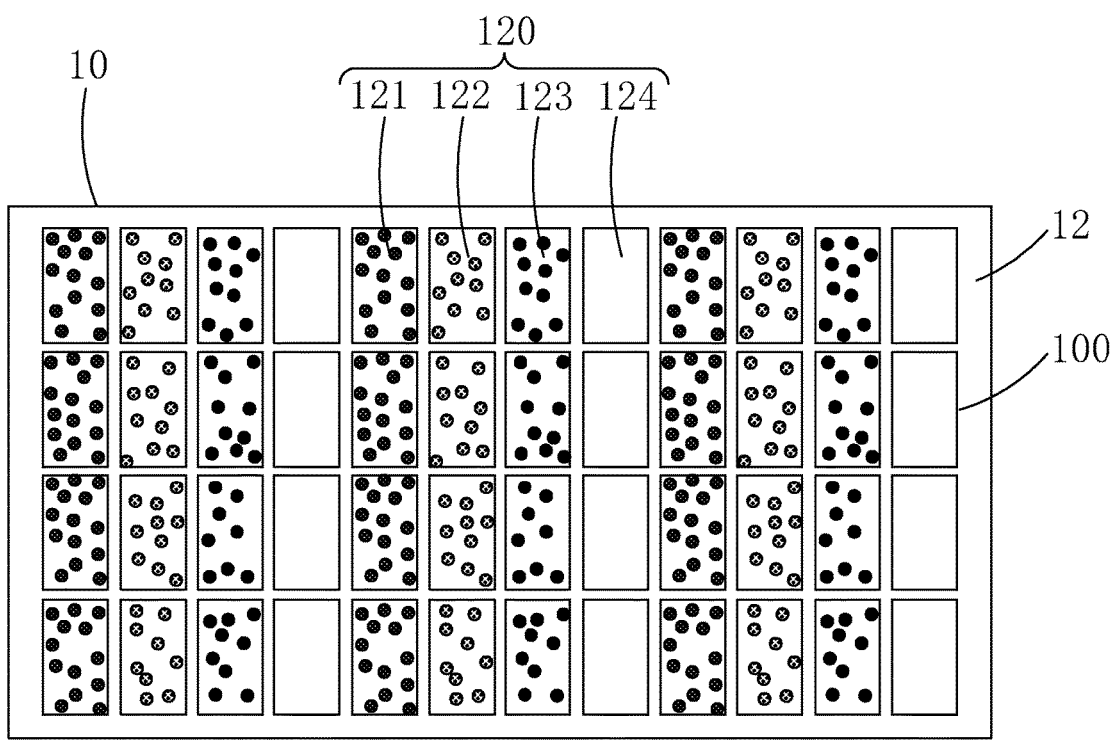
FIG. 1 is a top view diagram of an upper substrate in a display panel of the present invention.
Figure 2:
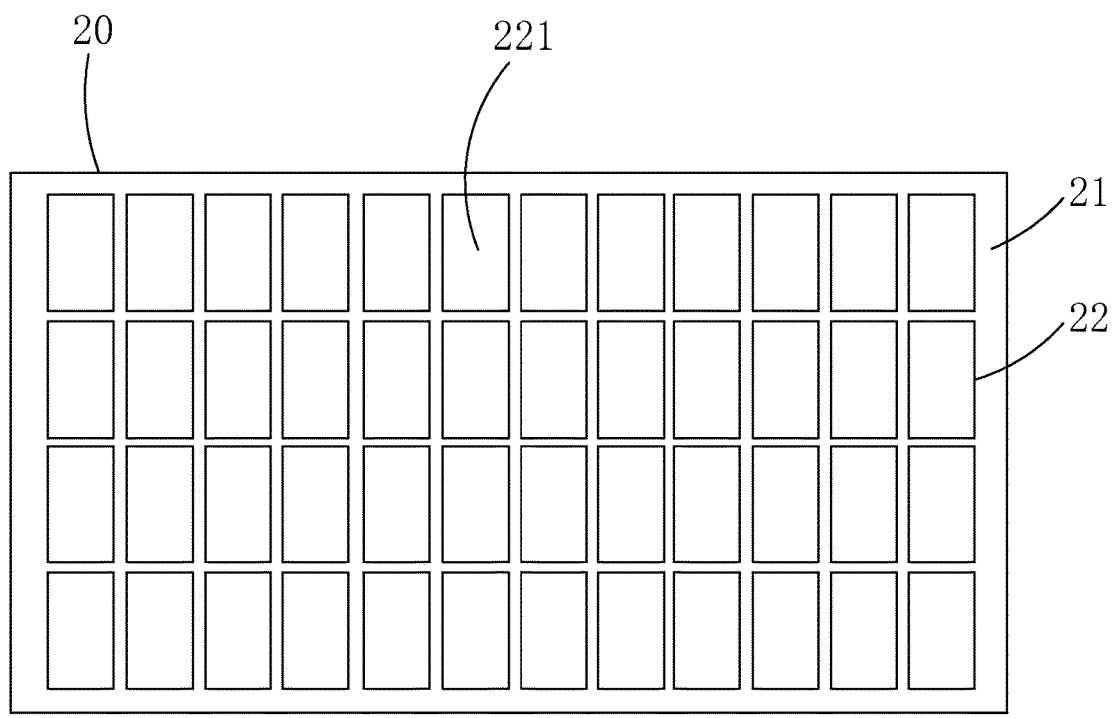
FIG. 2 is a top view diagram of a lower substrate in a display panel of the present invention.

Please refer to FIG. 1 and FIG. 2. The present invention first provides a display panel, comprising an upper substrate 10, a lower substrate 20 and a border adhesive (not shown) at a border position between the upper substrate 10 and the lower substrate 20.

Please refer to FIG. 1. The upper substrate 10 comprises a first transparent substrate (not shown) and a transparent organic material layer 12 located on the first transparent substrate, and in the transparent organic material layer 12, a plurality of rectangular via holes aligned in array, and the plurality of rectangular via holes and the first transparent substrate surround to form a plurality of sub pixel recesses 100, and the plurality of sub pixel recesses 100 comprises a red sub pixel recess 121, a green sub pixel recess 122, a blue sub pixel recess 123 and a white sub pixel recess 124; a mixture of red quantum dots and PDLC is provided in the red sub pixel recess 121, and a mixture of green quantum dots and PDLC is provided in the green sub pixel recess 122, and a mixture of blue quantum dots and PDLC is provided in the blue sub pixel recess 123, and only PDLC is provided in the white sub pixel recess 124.

Specifically, in the plurality of sub pixel recesses 100, a plurality of pixel units 120 are constituted with every four sub pixel recesses are a group, and each pixel unit 120 comprises one red sub pixel recess 121, one green sub pixel recess 122, one blue sub pixel recess 123 and one white sub pixel recess 124. In the pixel unit 120, the red sub pixel recess 121, the green sub pixel recess 122, the blue sub pixel recess 123 and the white sub pixel recess 124 can be aligned in arbitrary orders.

Specifically, all the red quantum dots, the green quantum dots, the blue quantum dots are electroluminescent quantum dots.

Therefore, in condition that a bias light is white light and voltages are applied, the red sub pixel recess 121, the green sub pixel recess 122, the blue sub pixel recess 123 and the white sub pixel recess 124 respectively emit red light, green light, blue light and white light, and intensities of the red light, the green light, the blue light and the white light emitted from the red sub pixel recess 121, the green sub pixel recess 122, the blue sub pixel recess 123 and the white sub pixel recess 124 increase along with increase of driving voltages. In condition that no applied voltages exist, all the red sub pixel recess 121, the green sub pixel recess 122, the blue sub pixel recess 123 and the white sub pixel recess 124 appear to be blur and opaque.

Preferably, the first transparent substrate is a glass substrate.

Please refer to FIG. 2. The lower substrate 20 comprises a second transparent substrate 21, a TFT layer (not shown) located on the second transparent substrate 21 and a pixel electrode layer 22 located on the TFT layer.

The pixel electrode layer 22 comprises a plurality of pixel electrodes 221 aligned in array, and the plurality of pixel electrodes 221 are respectively located corresponding to the plurality of sub pixel recesses 100 on the upper substrate 10 to drive the polymer dispersed liquid crystal in the sub pixel recesses 100 and excite the quantum dots to emit light.

Specifically, the second transparent substrate 21 is a glass substrate, and material of pixel electrode layer is ITO (Indium Tin Oxide).

Specifically, spacers are provided in the border adhesive to maintain a gap between the upper, lower substrates 10, 20.

The display panel provided by the present invention combines the polymer dispersed liquid crystal and the quantum dots, and modifies the structure of traditional upper, lower substrates to form a new type display panel. In comparison with the traditional display panel, the components, the color filter, the alignment films and polarizers are eliminated, and the structure is simple, and the manufacture cost is low, and meanwhile, the display result of the display panel according to the present invention is new and special, and five display effects of red, green, blue, white, and blur-opaque are provided and the great display quality is possessed.

Figure 3:
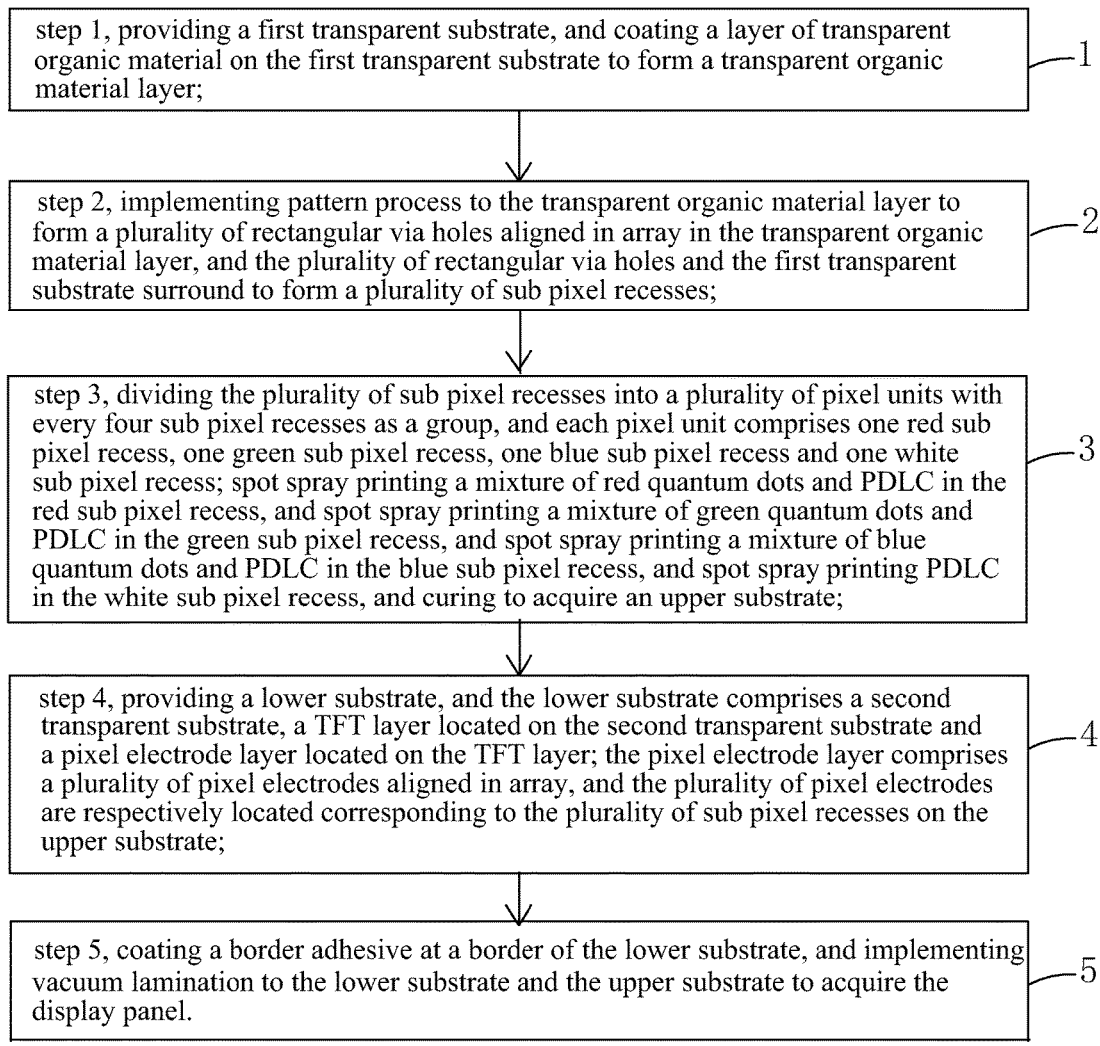
FIG. 3 is a flowchart of a manufacture method of a display panel according to the present invention.
Figure 4:
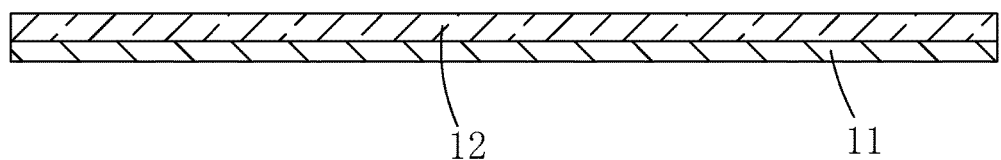
FIG. 4 is a diagram of the step 1 in the manufacture method of the display panel according to the present invention.

Please refer to FIG. 3. The present invention further provides a manufacture method of the aforesaid display panel, comprising steps of:

step 1, as shown in FIG. 4, providing a first transparent substrate 11, and coating a layer of transparent organic material on the first transparent substrate 11 to form a transparent organic material layer 12.

Figure 5:
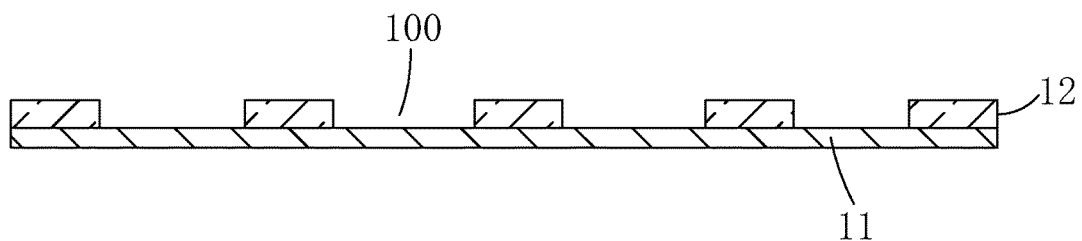
FIG. 5 is a sectional diagram of a sub pixel recess manufactured in the step 2 of the manufacture method of the display panel according to the present invention.
Figure 6:
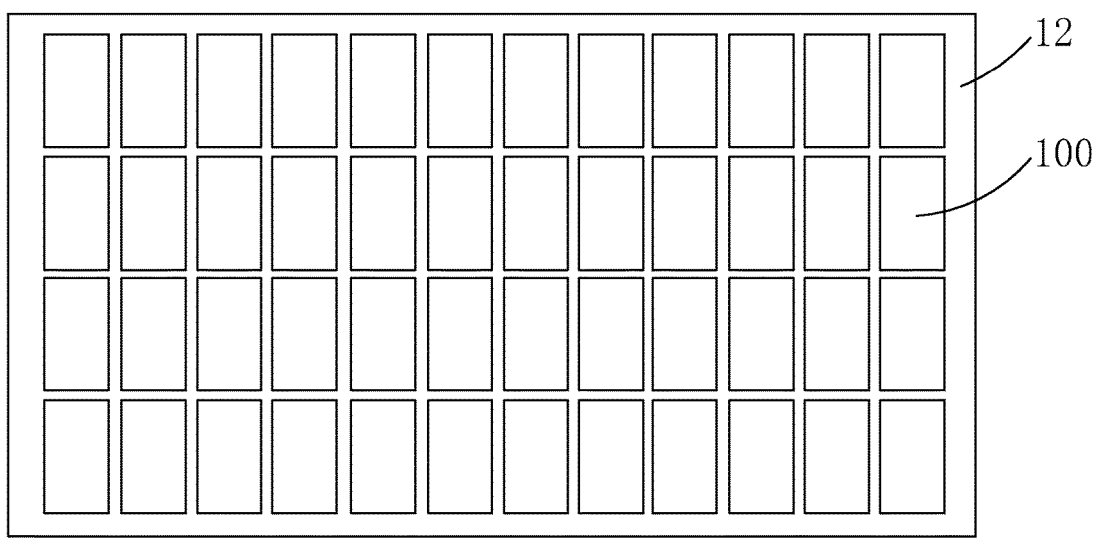
FIG. 6 is a top view diagram of a sub pixel recess manufactured in the step 2 of the manufacture method of the display panel according to the present invention.

Preferably, the first transparent substrate 11 is a glass substrate.

step 2, as shown in FIG. 5 and FIG. 6, implementing pattern process to the transparent organic material layer 12 to form a plurality of rectangular via holes aligned in array in the transparent organic material layer 12, and the plurality of rectangular via holes and the first transparent substrate 11 surround to form a plurality of sub pixel recesses 100.

The step 2 specifically is: coating a photoresist layer on the transparent organic material layer 12, and implementing exposure, development to the photoresist layer with a mask, and etching the transparent organic material layer 12 with the photoresist layer as being a mask layer to acquire the plurality of rectangular via holes aligned in array, and the plurality of rectangular via holes and the first transparent substrate 11 surround to form a plurality of sub pixel recesses 100, and removing the photoresist layer.

step 3, referring to FIG. 1, dividing the plurality of sub pixel recesses 100 into a plurality of pixel units 120 with every four sub pixel recesses as a group, and each pixel unit 120 comprises one red sub pixel recess 121, one green sub pixel recess 122, one blue sub pixel recess 123 and one white sub pixel recess 124; spot spray printing a mixture of red quantum dots and PDLC in the red sub pixel recess 121, and spot spray printing a mixture of green quantum dots and PDLC in the green sub pixel recess 122, and spot spray printing a mixture of blue quantum dots and PDLC in the blue sub pixel recess 123, and spot spray printing PDLC in the white sub pixel recess 124, and curing to acquire an upper substrate shown in FIG. 1.

Specifically, in the pixel unit 120, the red sub pixel recess 121, the green sub pixel recess 122, the blue sub pixel recess 123 and the white sub pixel recess 124 can be aligned in arbitrary orders.

Specifically, all the red quantum dots, the green quantum dots, the blue quantum dots are electroluminescent quantum dots.

step 4, referring to FIG. 2, providing a lower substrate 20, and the lower substrate 20 comprises a second transparent substrate 21, a TFT layer (not shown) located on the second transparent substrate 21 and a pixel electrode layer 22 located on the TFT layer; the pixel electrode layer 22 comprises a plurality of pixel electrodes 221 aligned in array, and the plurality of pixel electrodes 221 are respectively located corresponding to the plurality of sub pixel recesses 100 on the upper substrate 10.

Preferably, the second transparent substrate 21 is a glass substrate. Material of pixel electrode layer is ITO (Indium Tin Oxide).

step 5, coating a border adhesive at a border of the lower substrate 20, and implementing vacuum lamination to the lower substrate 20 and the upper substrate 10 to acquire the display panel.

Specifically, spacers are provided in the border adhesive to maintain a gap between the upper, lower substrates 10, 20.

The aforesaid manufacture method of the display panel combines the polymer dispersed liquid crystal and the quantum dots, and modifies the structure of traditional upper, lower substrates to acquire a new type display panel. In comparison with the manufacture process of the traditional display panel, the manufacture or addition of the color filter, the alignment films and polarizers are eliminated, and the manufacture process is simple, and the manufacture cost is low, and meanwhile, the display result is new and special, and five display effects of red, green, blue, white, and blur-opaque are provided and the great display quality is possessed.

In conclusion, the present invention provides a display panel and a manufacture method thereof, of which the structure of the display panel is simple, and the manufacture cost is low, and meanwhile, the great display quality is possessed. The manufacture method of the display panel according to the present invention combines the polymer dispersed liquid crystal and the quantum dots, and modifies the structure of traditional upper, lower substrates to acquire a new type display panel. In comparison with the manufacture process of the traditional display panel, the manufacture or addition of the color filter, the alignment films and polarizers are eliminated, and the manufacture process is simple, and the manufacture cost is low, and meanwhile, the display result of the manufactured display panel is new and special, and five display effects of red, green, blue, white, and blur-opaque are provided and the great display quality is possessed.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacture method of a display panel, comprising steps of:
    step 1, providing a first transparent substrate, and coating a layer of transparent organic material on the first transparent substrate to form a transparent organic material layer;
    step 2, implementing a pattern process to the transparent organic material layer to form a plurality of rectangular via holes aligned in array in the transparent organic material layer, and the plurality of rectangular via holes and the first transparent substrate surround to form a plurality of sub pixel recesses;
    step 3, dividing the plurality of sub pixel recesses into a plurality of pixel units with every four sub pixel recesses as a group, and each pixel unit comprises one red sub pixel recess, one green sub pixel recess, one blue sub pixel recess and one white sub pixel recess; spot spray printing a mixture of red quantum dots and polymer dispersed liquid crystal (PDLC) in the red sub pixel recess, and spot spray printing a mixture of green quantum dots and PDLC in the green sub pixel recess, and spot spray printing a mixture of blue quantum dots and PDLC in the blue sub pixel recess, and spot spray printing PDLC in the white sub pixel recess, and curing to acquire an upper substrate;
    step 4, providing a lower substrate, and the lower substrate comprises a second transparent substrate, a thin film transistor (TFT) layer located on the second transparent substrate and a pixel electrode layer located on the TFT layer; the pixel electrode layer comprises a plurality of pixel electrodes aligned in array, and the plurality of pixel electrodes are respectively located corresponding to the plurality of sub pixel recesses on the upper substrate; and
    step 5, coating a border adhesive at a border of the lower substrate, and implementing vacuum lamination to the lower substrate and the upper substrate to acquire the display panel;
    wherein spacers are provided in the border adhesive coated in step 5.

2. The manufacture method of the display panel according to claim 1, wherein step 2 specifically is: coating a photoresist layer on the transparent organic material layer, and implementing exposure, development to the photoresist layer with a mask, and etching the transparent organic material layer with the photoresist layer being a mask layer to acquire the plurality of rectangular via holes aligned in array, and the plurality of rectangular via holes and the first transparent substrate surround to form a plurality of sub pixel recesses, and removing the photoresist layer.

3. The manufacture method of the display panel according to claim 1, wherein in each pixel unit, the red sub pixel recess, the green sub pixel recess, the blue sub pixel recess and the white sub pixel recess are aligned in arbitrary orders.

4. The manufacture method of the display panel according to claim 1, wherein all the red quantum dots, the green quantum dots, the blue quantum dots are electroluminescent quantum dots.

* * * * *